(12) United States Patent
Kaufmann et al.

(10) Patent No.: US 9,749,277 B1
(45) Date of Patent: Aug. 29, 2017

(54) SYSTEMS AND METHODS FOR ESTIMATING SENDER SIMILARITY BASED ON USER LABELS

(71) Applicant: Google Inc., Mountain View, CA (US)

(72) Inventors: Tobias Kaufmann, Zurich (CH); Andrew Dai, San Francisco, CA (US)

(73) Assignee: Google Inc., Mountain View, CA (US)

( * ) Notice: Subject to any disclaimer, the term of this patent is extended or adjusted under 35 U.S.C. 154(b) by 309 days.

(21) Appl. No.: 14/574,272

(22) Filed: Dec. 17, 2014

(51) Int. Cl.
*H04L 12/58* (2006.01)

(52) U.S. Cl.
CPC ............ *H04L 51/22* (2013.01); *H04L 51/12* (2013.01)

(58) Field of Classification Search
USPC ........ 709/207, 204, 205, 206, 201, 202, 203
See application file for complete search history.

(56) References Cited

U.S. PATENT DOCUMENTS

| | | | |
|---|---|---|---|
| 7,805,518 B1 * | 9/2010 | Kamvar | H04L 63/126 709/227 |
| 7,917,587 B2 * | 3/2011 | Zeng | G06Q 10/107 709/206 |

FOREIGN PATENT DOCUMENTS

WO  WO 2004013796 A1 * 2/2004 ......... G06Q 30/0254

* cited by examiner

*Primary Examiner* — Chris Parry
*Assistant Examiner* — Caroline Jahnige
(74) *Attorney, Agent, or Firm* — Morgan, Lewis & Bockius LLP

(57) ABSTRACT

A method assigns categories to electronic messages. Users assign labels to messages received from multiple senders. The user-assigned labels are aggregated into a co-occurrence matrix whose axes correspond to the plurality of senders. Each matrix entry measures the extent to which users have assigned identical user-assigned labels to the pair of senders. Using the co-occurrence matrix, a latent vector is computed for each sender. A user re-categorizes a message received from a first sender, assigning the message to a first category. One or more second senders are identified that are similar to the first sender. Similarity of senders is measured by proximity of the latent vectors corresponding to the senders. One or more second messages are identified from the second senders, and the user is presented with the suggestion to reclassify the second messages under the first category. Upon user confirmation, the second messages are reclassified.

20 Claims, 10 Drawing Sheets

SYSTEMS AND METHODS FOR ESTIMATING SENDER SIMILARITY BASED ON USER LABELS

TECHNICAL FIELD

The disclosure relates generally to categorizing electronic messages, and more specifically to categorizing electronic messages based on similarity of senders.

BACKGROUND

Electronic messaging, such as through email, is a powerful communication tool for the dissemination of information. However, the ease of sending messages can result in a recipient receiving large numbers of messages in a single day. This is because, in addition to messages sent by actual people, a recipient may receive messages generated by machines from third party services such as airlines, invitation generating companies, courier services, and social media sites. These messages may include confirmations, notifications, promotions, social media updates, and messages from collaboration systems.

The classification of messages into message categories helps recipients to parse through all of these messages. For example, having messages classified into just a few basic categories (e.g., promotions, social, updates, and forums) greatly assists a recipient in determining which messages to review, and allows the recipient to review message that are of a similar type at the same time (e.g., all personal messages at the same time). Moreover, such classification helps to put similar messages in the same place, for ease of comparison. Message classification provides a more efficient, productive environment for recipients. This is useful for both current electronic messages and past messages.

One way to handle electronic messages is to implement automatic foldering. That is, automatically move a user's electronic messages into folders based on either filtering rules or categorization rules. However, such schemes have drawbacks. One problem is the reliance on the accuracy of classifiers on real-world data. While classifiers can classify electronic messages, the accuracy is inherently limited. Another problem is that users distrust automatic schemes in which electronic messages may be placed into unexpected folders, making them difficult to find.

Although automatic foldering has its drawbacks, the classification of messages, into message categories can help users to review their messages. Fairly accurate classifiers have been developed to correctly categorize many messages, particularly when the set of message categories is small. When a message is misclassified, a user may manually re-categorize the message. For example, an automated classifier may classify a given message as a "promotion." The message recipient considers the message to be in the "social" category. The message recipient uses the messaging application to change the message category from "promotion" to "social." Message category correction events are commonly done in order to provide the user with a means for more easily retrieving the message at a later date. When messages are correctly categorized, the user can find them (manually or with a search tool).

Manual category correction, however, is inefficient, particularly for a user with a large number of messages or for a user with a mobile device that has limited user interface functionality. Because of this, many users do not re-categorize messages at all or re-categorize only a limited number of misclassified messages.

Therefore, there is a need for a more efficient process to reclassify messages.

SUMMARY

Disclosed implementations address the above deficiencies and other problems associated with categorizing electronic messages. Some implementations enable a user to correct the categories of multiple messages at the same time by identifying similar messages. Some methods of identifying similar messages are described in U.S. patent application Ser. No. 14/557,310, entitled "Systems and Methods for Estimating Message Similarity," filed Dec. 1, 2014, which is incorporated herein by reference in its entirety. Some implementations identify similar messages based on the similarity of the senders, as described herein. If two message senders are identified as sufficiently similar, then it is likely that messages from the two senders should be classified in the same way. Therefore, when a user reclassifies messages from one of the senders, the messaging application can recommend reclassifying the messages from the other sender in the same way.

Similarity of message senders can be used in other ways as well. For example, when rules-based classification has one or more rules based on sender, senders that are identified as similar can be treated the same way with respect to the rules. As another example, if a user chooses to whitelist or blacklist a specific sender (e.g., all messages from a specific sender are categorized as spam), the user may want to categorize messages from similar senders in the same way. Indeed, once similarity of senders has been established, when a user takes any action with respect to one sender, the same action can be applied automatically to the similar senders, or the recommended action may be presented to the user.

Some implementations use singular value decomposition (SVD), which decomposes a matrix M into a product $M \approx U \cdot \Sigma \cdot V^T$, where $\Sigma$ is a rectangular diagonal matrix containing the singular values of M. The first k columns of U and V provide k dimensional embedding vectors for each row and column of M, respectively. These embeddings are optimal in the sense that $U_{1 \ldots k} \cdot E \cdot V_{1 \ldots k}^T$ is an optimal rank-k approximation of M.

In a first implementation, $M_{ij}$ is 1 if sender j has been applied user label i and zero otherwise. In this case, SVD provides k dimensional embeddings for both senders and labels, which enable optimally reconstructing the original label sender pairs. This approach tends to be less satisfactory because clusters tend to group senders from a single user label rather than generalizing over many labels.

In a second implementation, M is chosen to be a co-occurrence matrix with $M_{ij}$ being the number of times that two senders i and j co-occur with the same user label. For this matrix, SVD yields k-dimensional sender embeddings, which optimally approximate the original co-occurrence matrix. One problem with this approach is that the co-occurrence matrix may be dominated by random co-occurrences of a few high-volume senders.

In order to better capture the significance of co-occurrences, some implementations replace the bare co-occurrence counts with pointwise mutual information (PMI). In some implementations, the pointwise mutual information is computed as $$M_{ij} = \log\left(\frac{c_{ij}N}{c_i c_j}\right).$$

Here, $c_{ij}$ is the number of times sender i and j co-occur in a user label, $c_i$ is the number of times sender i occurs in a user label, $c_j$ is the number of times sender j occurs in a user label, and N is the total number of user labels. If the counts $c_{ij}$ could be explained by random co-occurrence (i.e.

$$\frac{c_{ij}}{N} = \frac{c_i}{N} \cdot \frac{c_j}{N},),$$

the PMI is equal to zero. To reduce noise, some implementations set $M_{ij}$ to zero when the PMI is smaller than some positive threshold.

In some implementations, only sender pairs with at least 5 co-occurrences were considered, and matrix cells with a PMI less than 1 were set to 0. In some implementations, 50,000 or more senders are considered simultaneously in order to measure sender similarity. In some implementations, the computed latent vectors have 50 dimensions.

In accordance with some implementations, a method assigns categories to electronic messages. The method is performed at a computing device having one or more processors and memory storing one or more programs configured for execution by the one or more processors. The computing device receives from a plurality of users user-assigned labels for a plurality of electronic messages received from a plurality of senders. In some implementations, the labels are user-defined (a user can make up whatever labels they want). Some implementations provide a predefined starter-set of labels, in which case a user may use one of those labels or create a new one. In some instances, the number of users, messages, and senders is small (e.g., less than 100). In other instances, the number of users, messages, and/or senders is very large (e.g., millions or hundreds of millions).

The computing device aggregates the received user-assigned labels into a co-occurrence matrix whose rows and columns correspond to the plurality of senders. The (s, t) entry of the matrix measures the extent to which users assign the same user-assigned labels to the senders s and t. Because of the symmetric roles of the two senders, the (s, t) entry of the matrix is the same as the (t, s) entry.

In some implementations, the (s, t) entry of the matrix is equal to the number of times that senders s and t co-occur in the same user-assigned label from the same user. For example, if a single user assigns the label $L_1$ to a message from sender s and assigns the same label $L_1$ to a message from sender t, that would add to the count. If the same user assigns a second label $L_2$ to a message from sender s (which may or may not be the same message assigned the label $L_1$) and assigns the same label $L_2$ to a message from sender t, then that would also add to the count. That is, a single user can contribute more than once to the count. In addition, if a second user assigns a label $L_3$ to messages from senders s and t, that would add to the count for the (s, t) entry. That is, multiple users can add to the count for the (s, t) entry, regardless of what labels are used (as long as a single user assigns the same label to messages from both sender s and sender t).

In some implementations, the entries of the co-occurrence matrix M comprise pointwise mutual information. In some implementations, the pointwise mutual information for entry (s, t) is computed as $$\left(\frac{c_{st}N}{c_s c_t}\right),$$

where N is the total number of distinct user-assigned labels, $c_{st}$ is the number of times that senders s and t co-occur in the same user-assigned label from the same user, $c_s$ is the number of times a user has assigned a user-assigned label to a message from sender s, and $c_t$ is the number of times a user has assigned a user-assigned label to a message from sender t.

The computing device uses the co-occurrence matrix to compute a corresponding respective latent vector for each sender of the plurality of senders. Typically, all of the latent vectors have the same number (n) of dimensions. The number n is generally much smaller than the number of senders. For example, the number of dimensions of the latent vectors may be 40 or 50, whereas the number of senders may be hundreds or even thousands. In instances where the number of senders is small (e.g., 50 or less), some implementations omit the step of computing latent vectors. In some implementations, the latent vectors are computed using singular value decomposition. In some implementations, the latent vectors are computed using probabilistic matrix factorization.

In some implementations, the computing device receives user selection to reclassify an electronic message that was received from a first sender. Reclassifying the electronic message includes assigning the electronic message to a first message category, which is different from a previously assigned category. Categories, including the first message category, are used for grouping of electronic messages in a user interface.

The computing device identifies one or more second senders that are similar to the first sender. In some implementations, similarity of senders is determined by measuring proximity of the latent vectors corresponding to the senders. In some implementations, measuring proximity of a first latent vector and a second latent vector comprises computing the Euclidean distance between the first and second latent vectors. In some implementations, measuring proximity of a first latent vector $x=[x_i]$ and a second latent vector $y=[y_i]$ comprises computing $$\sqrt[p]{\sum_{i=1}^{n} |x_i - y_i|^p}$$

for a predetermined positive integer p. Note that p=2 corresponds to ordinary Euclidean distance. In some implementations, measuring proximity of a first latent vector $x=[x_i]$ and a second latent vector $y=[y_i]$ comprises computing $\max_i |x_i - y_i|$, where i ranges over the dimensions of the latent vectors. In some implementations, measuring proximity of a first latent vector x and a second latent vector y comprises computing cosine similarity of the first and second latent vectors x and y. Typically, cosine similarity of latent vectors x and y is computed using the formula $$\cos(\theta) = \frac{x \cdot y}{\|x\| \|y\|},$$

where x·y is the dot product of the latent vectors x and y. In each case, the measured similarity of latent vectors is compared against a similarity threshold value to determine if the vectors (and thus the corresponding senders) are considered "similar." In some implementations, the similarity threshold is configurable, either at a global level and/or for each individual user.

Some implementations identify similar senders in other ways. In some implementations, a clustering algorithm (e.g., k-means or affinity propagation) is applied to the set of senders (using the latent vectors), and all of the senders within a cluster are identified as similar to each other. In addition, Some implementations use a label propagation algorithm, which enables identifying similar senders in some instances even for senders that have limited or no labels assigned.

The computing device identifies one or more second messages received by the user from the one or more second senders, where the one or more second messages are not assigned to the first message category. The computing device presents the user with the suggestion to reclassify the one or more second messages under the first message category. The user can confirm the suggestion for some of all of the second messages, in which case the selected messages are reclassified under the first message category.

Some implementations utilize sender similarity as part of computing message similarity. For example, sender similarity can be used to supplement the techniques disclosed in U.S. patent application Ser. No. 14/557,310, entitled "Systems and Methods for Estimating Message Similarity," filed Dec. 1, 2014, which is incorporated by reference herein in its entirety.

Reclassifying messages is just one use of sender similarity. Sender similarity can be used in many other ways as well. Other uses of sender similarity include:
- by performing clustering in the space of latent vectors (embeddings) implementations can identify concepts or categories that are relevant to a user;
- for a particular category (e.g. "purchases") implementations can identify a corresponding cluster in the space of latent vectors and whitelist the corresponding senders to improve categorization;
- if a user defines a custom category (or user label) and assigns one or messages to that category, implementations can use similarity or clusters in latent vector space to suggest messages that should also be moved into the custom category. If the confidence is high enough, some implementations can automatically move new messages into custom categories. Note that this does not assume a pre-specified set of categories that are automatically assigned to messages; and
- similarity-based message search. A user selects a message and the email client displays a set of related messages. Some implementations use sender similarity as one of several signals to compute relatedness of messages.

Thus methods and systems are provided that enable users to manage their electronic messages more efficiently.

BRIEF DESCRIPTION OF THE DRAWINGS

For a better understanding of the aforementioned implementations of the invention as well as additional implementations thereof, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

The implementations described herein provide various technical solutions to improving the categorization of electronic messages generally, and to making the categorization process more efficient for users.

Figure 1:
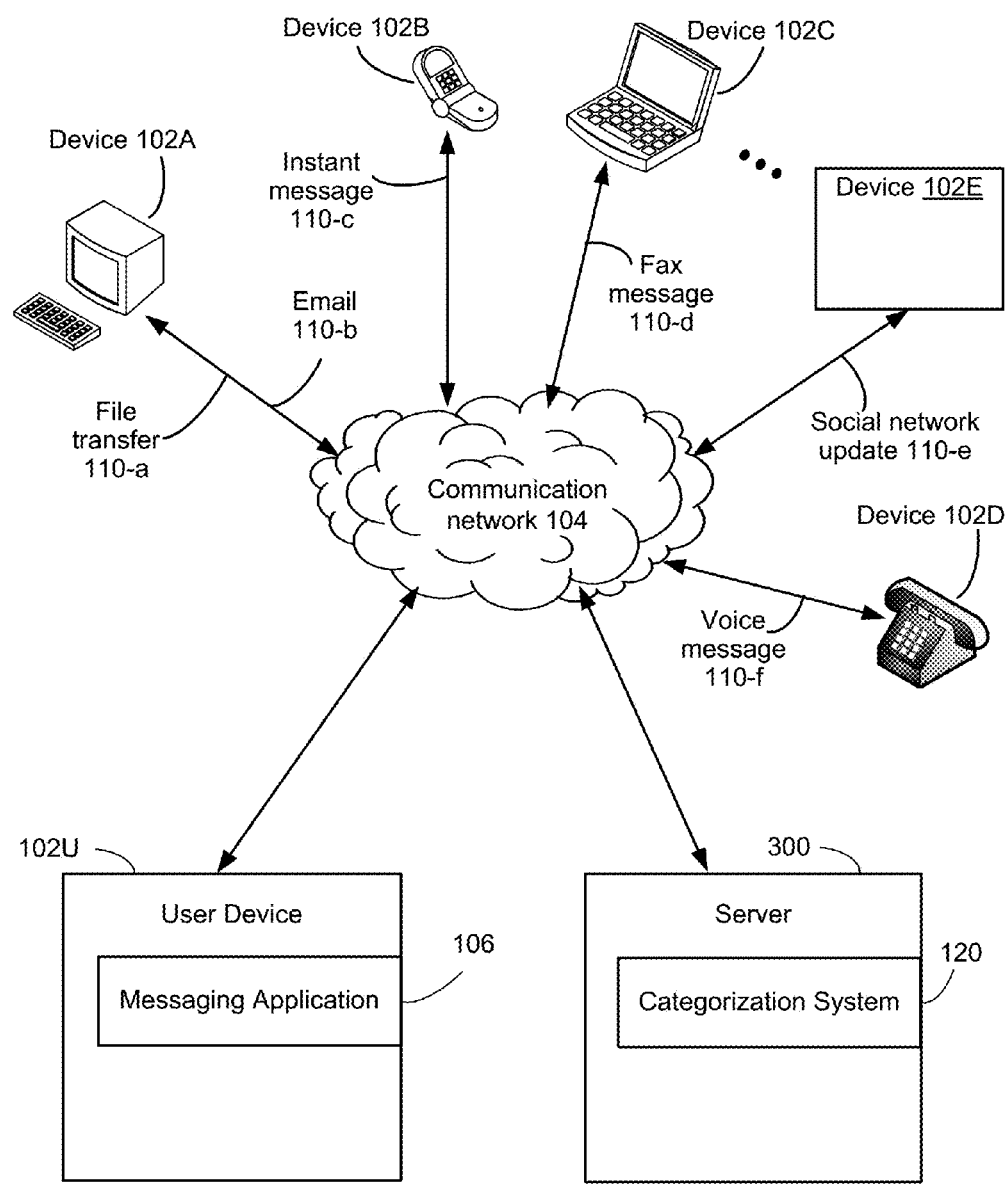
FIG. 1 illustrates a context in which some implementations operate.

FIG. 1 is a block diagram illustrating conceptually a context in which some implementations operate. Electronic messages may be generated by many different devices 102, such as a desktop computer 102A, a smart phone 102B, a laptop computer 102C, a telephone 102D, or an automated server 102E. The messages are transmitted over a communication network 104, and processed by a categorization system 120 at a server 300, or by a categorization module 224 within a messaging application 106 running on the message recipient's user device 102U. More generally, devices 102 that may transmit messages include phones (mobile or landline, smart phone or otherwise), tablet computers, other computers (mobile or otherwise, personal devices or servers), fax machines, and audio/video recorders.

In some implementations, a device 102U obtains an electronic message and transmits the electronic message to the categorization system 120. After categorization, the electronic message can be displayed with other electronic messages in the same category. For example, after determining that user Jack sends an electronic message to user Mary, the device 102U transmits the electronic message to the categorization system 120, which assigns the electronic message to a category and generates a visual object for display in a listing of electronic messages. In some implementations, the message is initially received at the server 300, categorized by the categorization system 120, and displayed appropriately at the user device 102U. In some implementations, the message is received at the user device 102U, processed by a categorization module 224, and displayed appropriately. As described in more detail below, a user can assign a message to a different category after the initial category has been assigned.

In some implementations, an electronic message is a file transfer 110-$a$ (e.g., a photo, document, or video download/upload), an email 110-$b$, an instant message 110-$c$, a fax message 110-$d$, a social network update 110-$e$, or a voice message 110-$f$. In some implementations, an electronic message is contact information, an indication of a document, a calendar entry, an email label, a recent search query, a suggested search query, or a web search result.

In some implementations, the user device 102U includes a messaging application 106. In some implementations, the messaging application 106 processes incoming and outgoing electronic messages into and from the device 102U, such as an outgoing email sent by a user of the device 102U to another user, or a chat message from another user to a user of the device 102U. In some implementations the messaging application 106 is an e-mail application or an instant messaging application.

In some implementations, the communication network 104 interconnects one or more devices 102 with each other, and with the server 300. In some implementations, the communication network 104 includes the Internet, one or more local area networks (LANs), one or more wide area networks (WANs), other types of networks, or a combination of such networks.

An example of a set of message categories is {promotions, social, updates, and forums}. Each message category in the set of message categories is associated with certain characteristics. A message containing a reservation may be classified as an "update" message. A message containing information about an event may be "promotion" message. If a recipient is asked to rate something, the email may be a "social" message. Some implementations include additional messages categories and/or allow users to create custom message categories.

In some implementations, the server 300 is part of a server system that includes a plurality of servers 300. In some implementations, the servers 300 are connected by an internal communication network or bus. A server system may include one or more web servers 322, which receive requests from users (e.g., from client devices 102) and return appropriate information, resources, links, and so on. In some implementations, the server system includes one or more application servers 324, which provide various applications, such as a messaging application 106. The server system typically includes one or more databases 332, which store information such as web pages, a user list 334, and various user information 338 (e.g., user names and encrypted passwords, user preferences, and so on).

Figure 2:
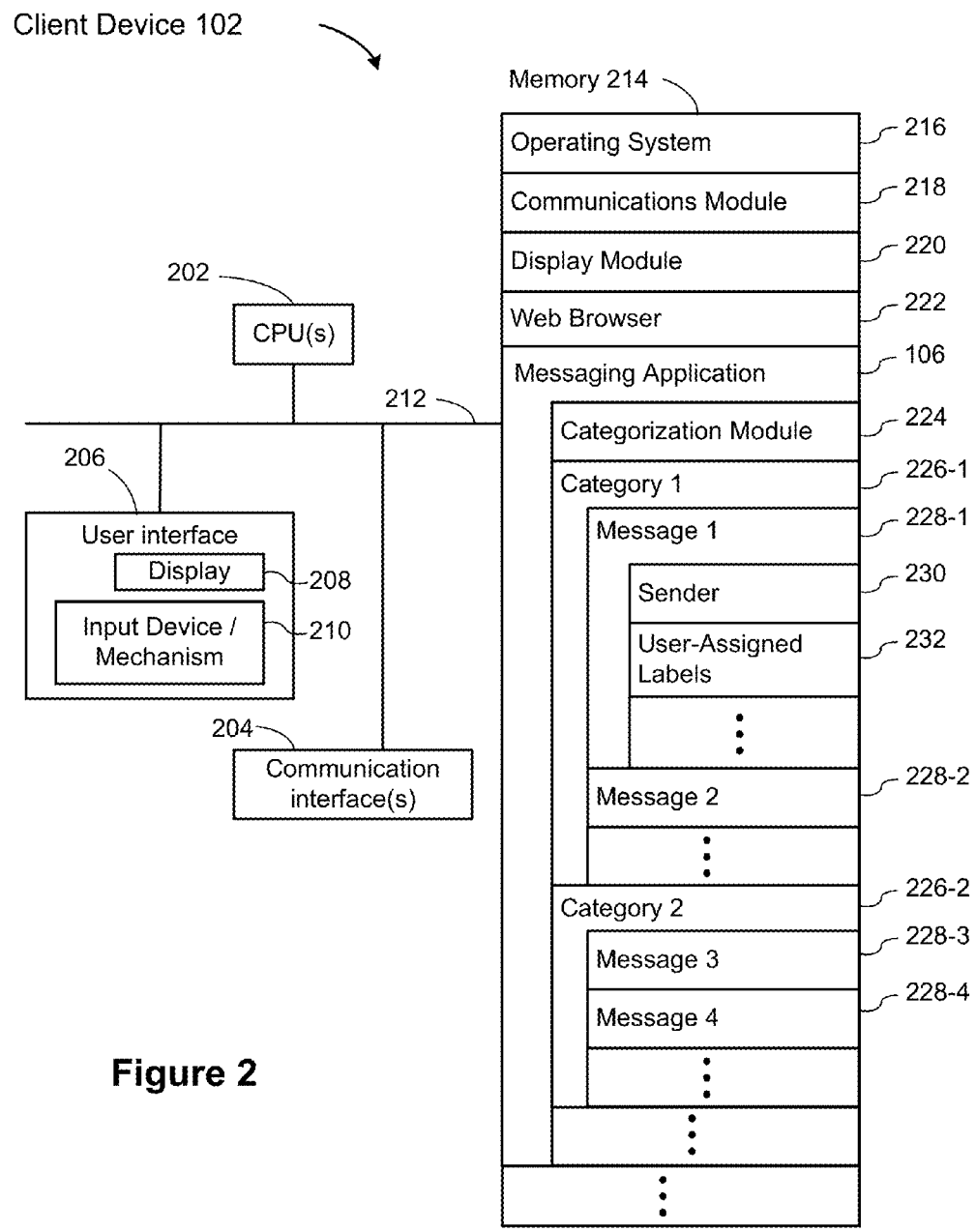
FIG. 2 is a block diagram of a user device according to some implementations.

FIG. 2 is a block diagram illustrating a client device 102, which a user uses to access a messaging application 106. A client device is also referred to as a user device, which may be a tablet computer, a laptop computer, a smart phone, a desktop computer, a PDA, or other computing device that can run a messaging application 106 and has access to a communication network 104. A client device 102 typically includes one or more processing units (CPUs) 202 for executing modules, programs, or instructions stored in memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. A client device 102 includes a user interface 206 comprising a display device 208 and one or more input devices or mechanisms 210. In some implementations, the input device/mechanism includes a keyboard and a mouse; in some implementations, the input device/mechanism includes a "soft" keyboard, which is displayed as needed on the display device 208, enabling a user to "press keys" that appear on the display 208.

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within the memory 214, comprises a non-transitory computer readable storage medium. In some implementations, the memory 214, or the computer readable storage medium of the memory 214, stores the following programs, modules, and data structures, or a subset thereof:
- an operating system 216, which includes procedures for handling various basic system services and for performing hardware dependent tasks;
- a communications module 218, which is used for connecting the client device 102 to other computers and devices via the one or more communication network interfaces 204 (wired or wireless) and one or more communication networks 104, such as the Internet, other wide area networks, local area networks, metropolitan area networks, and so on;
- a display module 220, which receives input from the one or more input devices 210, and generates user interface elements for display on the display device 208;
- a web browser 222, which enables a user to communicate over a network 104 (such as the Internet) with remote computers or devices;
- a messaging application 106, which enables the user to send and receive electronic messages. In some implementations, the messaging application is an email application. In some implementations, the messaging application is an instant messaging application. In some implementations, the messaging application 106 runs within the web browser 222. In some implementations, the messaging application 106 runs independently of a web browser 222 (e.g., a desktop application). In some implementations, the messaging application includes a categorization module 224, which assigns a category to each message. The categorization module is functionally similar to a categorization system 120, described below with respect to the server 300; and
- a plurality of categories 226, such as the categories 226-1 and 226-2 illustrated in FIG. 2. Each category may be assigned to zero or more messages so that messages assigned to the same category can be displayed together. In the illustrated example of FIG. 2, the first category 226-1 includes a first message 228-1 and a second message 228-2. Similarly, the second category 226-2 includes a third message 228-3 and a fourth message 228-4. Each message has a corresponding sender 230 (which may be a person or an automated process), which is generally identified by a unique sender identifier (e.g., an email address). In addition, a user can apply labels 232 to each message 228. In some implementations, the labels are selected from a predefined set of labels. In other implementations, users can create and assign labels themselves. For example, a parent may assign the labels "soccer" and "personal" to a message from a child's soccer league.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 may store a subset of the modules and data structures identified above. Furthermore, the memory 214 may store additional modules or data structures not described above.

Although FIG. 2 shows a client device 102, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
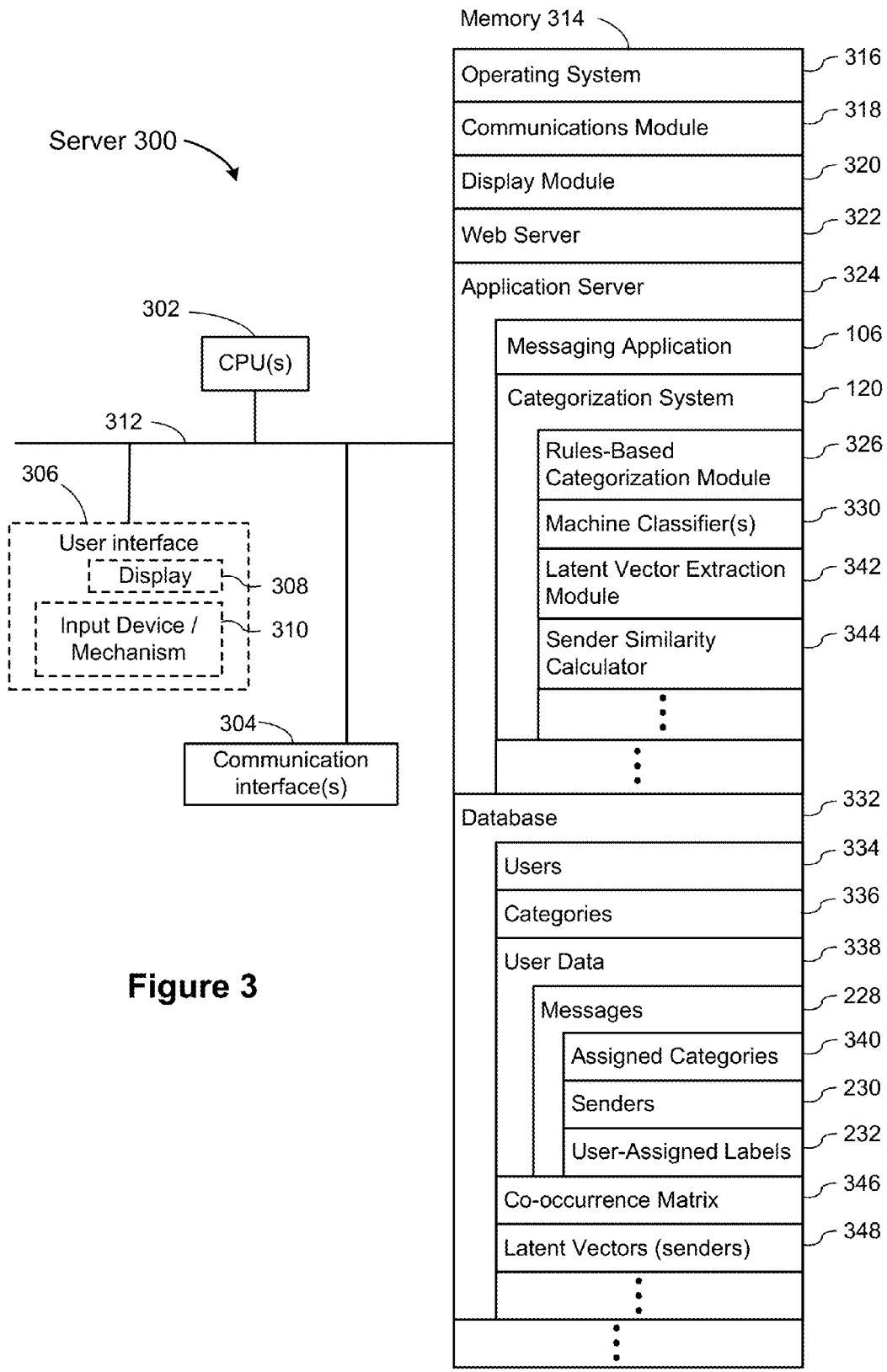
FIG. 3 is a block diagram of a server according to some implementations.

FIG. 3 is a block diagram illustrating a server 300, which may be used individually or as part of a server system. A typical server system includes many individual servers 300, such as 3, 10, or 100 individual servers. A server 300 typically includes one or more processing units (CPUs) 302 for executing modules, programs, or instructions stored in the memory 314 and thereby performing processing operations; one or more network or other communications interfaces 304; memory 314; and one or more communication buses 312 for interconnecting these components. The communication buses 312 may include circuitry (sometimes called a chipset) that interconnects and controls communications between system components. In some implementations, a server 300 includes a user interface 306, which may include a display device 308 and one or more input devices 310, such as a keyboard and a mouse.

Figure 5:
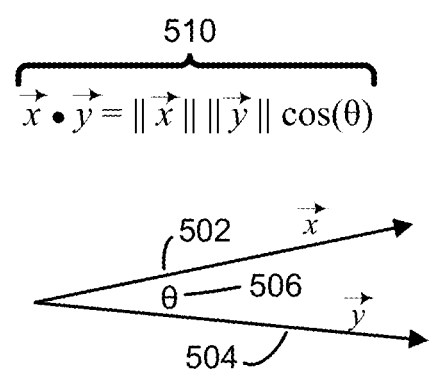
FIG. 5 illustrates how cosine similarity is computed and visualized geometrically in accordance with some implementations.
Figure 6:
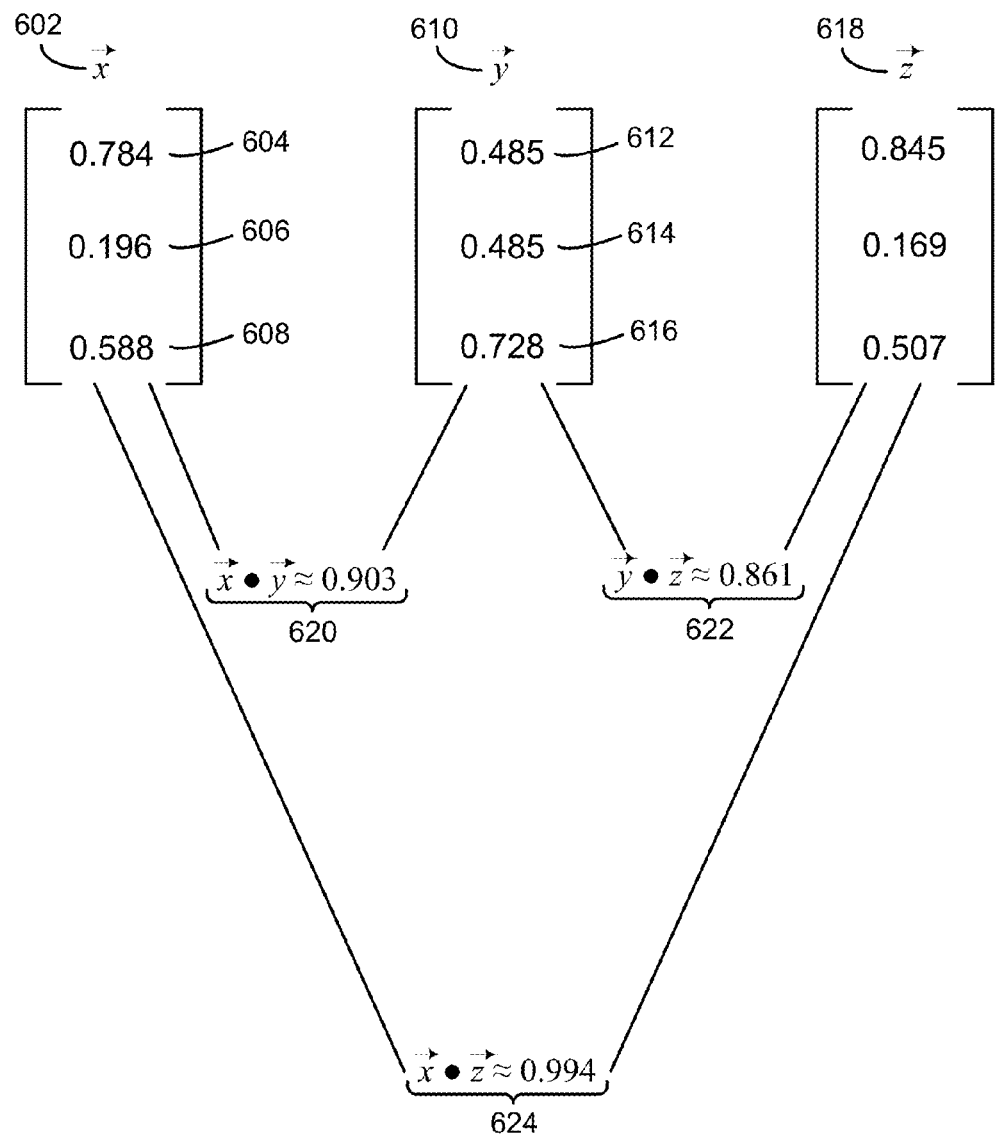
FIG. 6 illustrates computing the cosine similarities between three vectors in accordance with some implementations.
Figure 7:
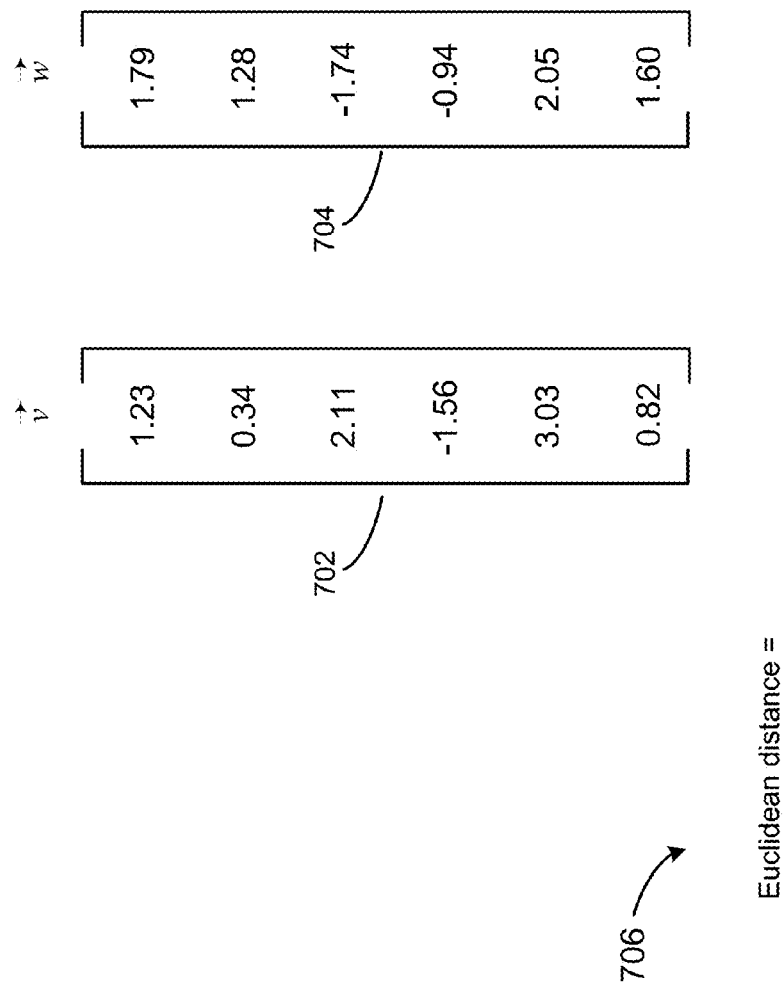
FIG. 7 illustrates computing the Euclidean distance between vectors in accordance with some implementations.

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within the memory 314, comprises a non-transitory computer readable storage medium. In some implementations, the memory 314, or the computer readable storage medium of the memory 314, stores the following programs, modules, and data structures, or a subset thereof:

- an operating system 316, which includes procedures for handling various basic system services and for performing hardware dependent tasks;
- a communications module 318, which is used for connecting the server 300 to other computers via the one or more communication network interfaces 304 (wired or wireless), an internal network or bus, or other communication networks 104, such as the Internet, other wide area networks, local area networks, metropolitan area networks, and so on;
- a display module 320, which receives input from one or more input devices 310, and generates user interface elements for display on a display device 308;
- one or more web servers 322, which receive requests from a client device 102, and return responsive web pages, resources, or links. In some implementations, each request is logged in the database 332;
- one or more application servers 324, which provide various applications (such as an email or other messaging application 106) to the client devices 102. In some instances, applications are provided as a set of web pages, which are delivered to the client devices 102 and displayed in a web browser 222. The web pages are delivered as needed or requested. In some instances, an application is delivered to a client device 102 as a download, which is installed and run from the client device 102 outside of a web browser 222;
- in some implementations, the messaging application 106 includes a categorization system 120, which is used to categorize received messages so that they can be grouped together for the recipient. Some implementations include a rules-based categorization module 326, which categorizes received messages based on a set of rules (e.g., if a message is from a certain set of senders and includes a specific keyword, then the message is categorized as a "social update"). In some implementations, rules-based categorization is effective for a large percentage of the incoming messages. Some implementations include one or more machine classifiers 330, which can be trained on messages that are not well-suited for rules-based categorization;
- a latent vector extraction module 342, which uses a co-occurrence matrix 346 to construct a latent vector 348 for each message sender 230. This is described with respect to FIG. 4 below;
- a sender similarity calculator 344, which uses the constructed latent vectors 348 for a pair of senders to compute the similarity of the senders. Implementations use various techniques to compute the similarity of sender latent vectors 348, some of which are illustrated in FIGS. 5-7 below. For example, some implementations use cosine similarity, some implementations use Euclidean distance, and some implementations use alternative distance metrics; and
- one or more databases 332, which store various data used by the modules or programs identified above. In some implementations, the database 332 includes a list of authorized users 334, which may include user names, encrypted passwords, and other relevant information about each user. The database 332 also stores categories 336, and information about the categories. Some implementations provide both system-defined categories as well as user-defined categories. The database also stores other user data 338. In particular, the user data 338 includes the received messages 228 and the assigned categories 340 for the messages. In some implementations, each message 228 is assigned to a unique category, but other implementations allow assignment to two or more categories. Each message has an associated sender 230, and each message may have zero or more labels 232 that are assigned by the recipient of the message. In some implementations, the database 332 stores the co-occurrence matrix 346 and/or the latent vectors 348 computed based on the co-occurrence matrix.

Each of the above identified elements in FIG. 3 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 314 may store a subset of the modules and data structures identified above. Furthermore, the memory 314 may store additional modules or data structures not described above.

Although FIG. 3 illustrates a server 300, FIG. 3 is intended more as a functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and may depend in part on the amount of data traffic that the system must handle during peak usage periods as well as during average usage periods.

As illustrated in FIGS. 2 and 3, the functionality for a messaging application may be shared between a client device 102 and a server 300. In some implementations, after the messaging application is installed on a client device 102, the majority of the subsequent processing occurs on the client device 102. For example, the classification is performed by a categorization module on the client device. In other implementations, the majority of the processing and data storage occurs at a server 300, and the client device 102 uses a web browser 222 to view and interact with the data. For example, the categorization of messages may be performed by the categorization system 120 at the server 300, and the messages themselves are stored in the database 332 on the server. One of skill in the art recognizes that various allocations of functionality between the client device 102 and the server 300 are possible, and some implementations support multiple configurations (e.g., based on user selection).

Users can assign labels to received messages. Some implementations enable a user to assign two or more labels to the same message, but other implementations allow at most one label per message (e.g., treating labels like folders). In some implementations, the set of allowed labels are predefined by the messaging application 106 (e.g., a set of 1000 distinct labels for a given language). In some implementations, a set of useful labels is predefined, but a user can create other labels as well. Labels can be very broad (e.g., "social") or very narrow (e.g., "Jackie's Birthday"). Labels are particularly useful when the same label is assigned to multiple messages received by one or more users.

Figure 4:
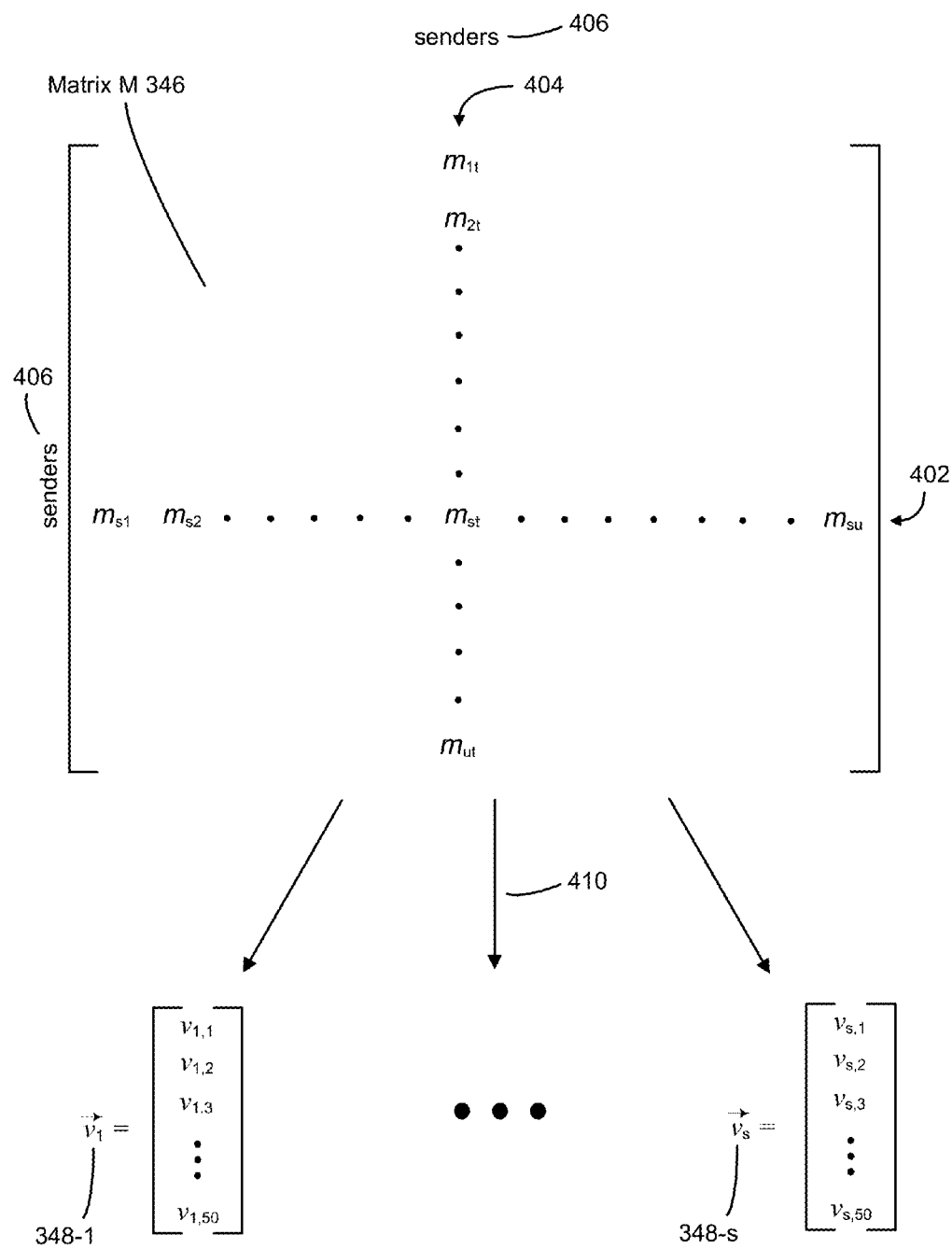
FIG. 4 illustrates schematically a co-occurrence matrix and corresponding latent vectors for the senders in accordance with some implementations.

The categorization system 120 collects the label data for many messages received by many different users from many different senders in order to build a co-occurrence matrix 346, as illustrated in FIG. 4. Both of the axes of the matrix (rows and columns) correspond to message senders 406. Each column corresponds to a distinct sender, and each row corresponds to a distinct sender. In this illustration, row s 402 corresponds to sender s, and column t 404 corresponds to sender t. In this example, there are u distinct senders. Because senders are used for both rows and columns, the matrix is symmetric. The (s, t) entry in the matrix measures the extent to which users assign the same user-assigned labels to the senders s and t. This can be measured in various ways, as described below with respect to FIG. 8A. Note that the entries in the matrix 346 are aggregated for all messages, all labels, and all users. This matrix is generally sparse.

Some implementations transform this matrix 346 in various ways. For example, some implementations eliminate rows or columns that have too few entries (e.g., less than 5 or less than 10). Some implementations apply mathematical transformations, such as computing the logarithm of the positive entries, or normalizing the entries. Some implementations set individual entries to zero if they are smaller than a threshold value.

Once the co-occurrence matrix is ready, implementations use the matrix 346 to compute (410) latent vectors 348 corresponding to each of the senders. Typically this involves choosing a fixed number of dimensions for the latent vectors (e.g., 50 dimensions, as illustrated in FIG. 4), and applying one or more algorithms. Some implementations use Singular Value Decomposition (SVD) to express the matrix M 346 as a product $M \approx U\Sigma V^T$, where U and V are orthogonal matrices and $\Sigma$ is a diagonal matrix. In some implementations, the columns of the matrix $V^T$ (truncated to n dimensions) are the latent vectors 348 (e.g., 348-1 . . . 348-s).

Some implementations use alternative techniques to compute the latent vectors 348. For example, some implementations use probabilistic matrix factorization. Typically the extraction of the latent vectors is performed at the server 300 (or server system) due to the processing requirements. The extraction of the latent vectors can be performed off-line and/or on a separate set of servers.

FIG. 5 illustrates one way of computing similarity of the latent vectors 348 for senders. Geometrically, there is an angle $\theta$ 506 between the two vectors x 502 and y 504. The angle $\theta$ and the vectors are related by the equation 510: $x \cdot y = \|x\| \, \|y\| \cos(\theta)$, where $x \cdot y$ is the dot product of the vectors x and y, $\|x\|$ is the length of the vectors x, and $\|y\|$ is the length of the vector y. Computation of dot products is illustrated for some three dimensional vectors in FIG. 6. The dot product is also used to compute the length of a vector, such as $\|x\| = \sqrt{x \cdot x}$. The length of a vector is sometimes referred to as the norm of the vector.

FIG. 6 illustrates three vectors x 602, y 610, and z 618, and the dot products of each pair of these vectors. This example is shown with three dimensional vectors, but the same technique applies to the latent vectors 348, which typically have many more dimensions (e.g., 40 or 50 dimensions). The vector x has three components, labeled 604, 606, and 608, and the vector y has the three components 612, 614, and 616. When computing the dot product 620 of x and y, corresponding components are multiplied and the products are summed together. For example, $x \cdot y = (0.784)(0.485) + (0.196)(0.485) + (0.588)(0.728)$. With the specified vectors, the dot products are $x \cdot y \approx 0.903$ (equation 620), $y \cdot z \approx 0.861$ (equation 622), and $x \cdot z \approx 0.994$ (equation 624). In this case, all three vectors have unit length, so the dot products are equal to the cosines of the angles between the vectors. In particular, because $x \cdot z \approx 0.994$, the angle between the vectors x and z is close to 0. Using cosine similarity, vectors x and z are likely to be considered similar, but the vector y is likely not sufficiently similar to either x or z.

FIG. 7 illustrates an alternative way to measure the proximity of two latent vectors. In this example, the vectors v 702 and w 704 have six dimensions, but the same techniques apply to vectors with many more dimensions. As illustrated in this example, the Euclidean distance 706 between the two vectors is computed as the square root of the sum of the squares of the differences for each of the vector components. When vectors have only two or three dimensions, this is sometimes referred to as the distance formula.

The Euclidean distance formula 706 can be modified to use an exponent other than 2. For example, some implementations compute the proximity of latent vectors using the formula $$\sqrt[p]{\sum_{i=1}^{n}|x_i-y_i|^p},$$

where x and y are the vectors, n is the number of dimensions for each of the vectors, and p is a positive integer. Choosing p=2 corresponds to Euclidean distance. When p is very large, the dominant factor is the dimension with the largest absolute difference. That is, for large values of p, the formula is essentially $\max_i |x_i - y_i|$, which is another way of measuring proximity of latent vectors.

Figure 8A:
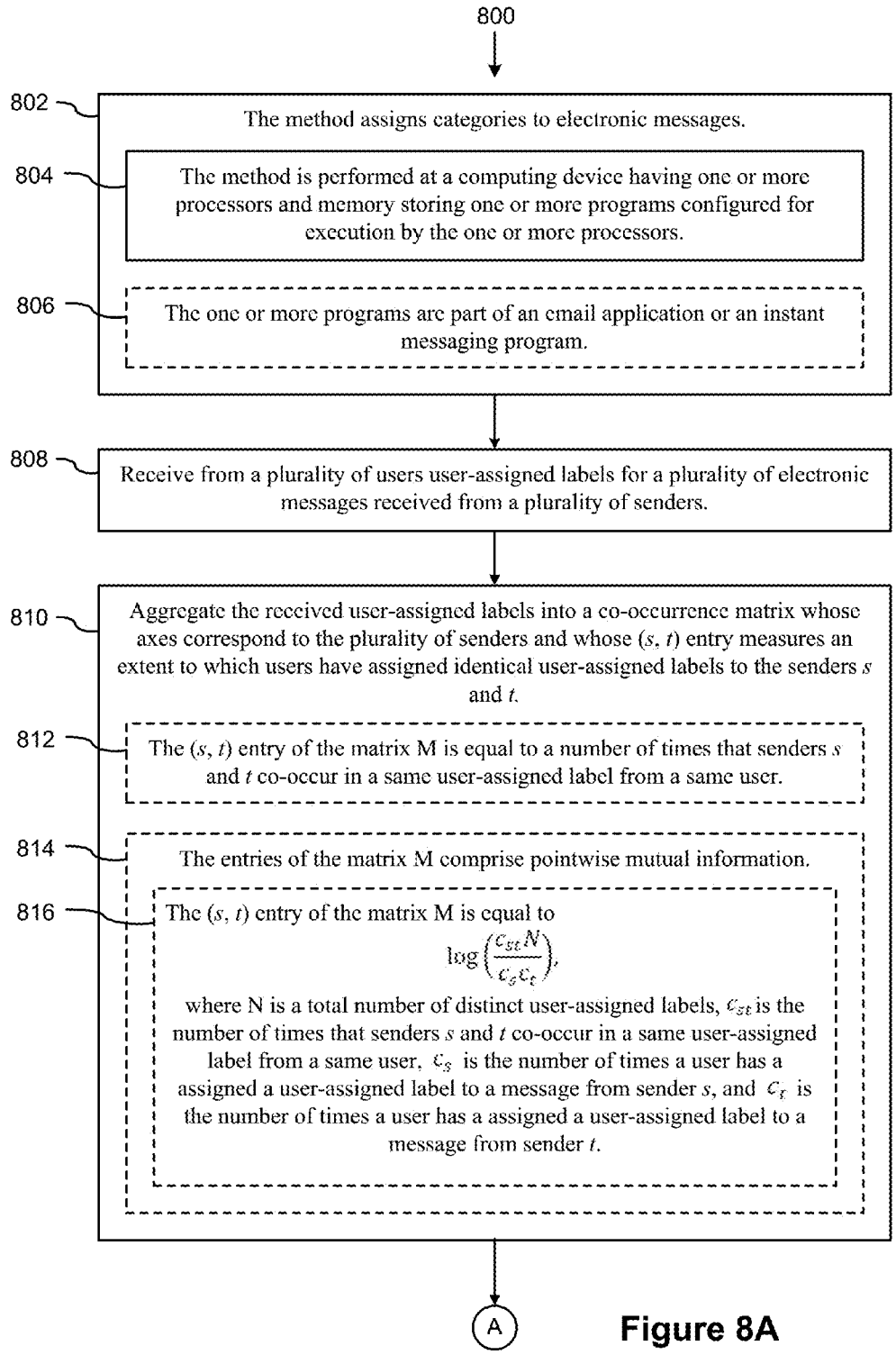
FIGS. 8A-8C provide a flowchart of a process, performed at a computing device (a client device or a server), for classifying electronic messages according to some implementations.
Figure 8B:
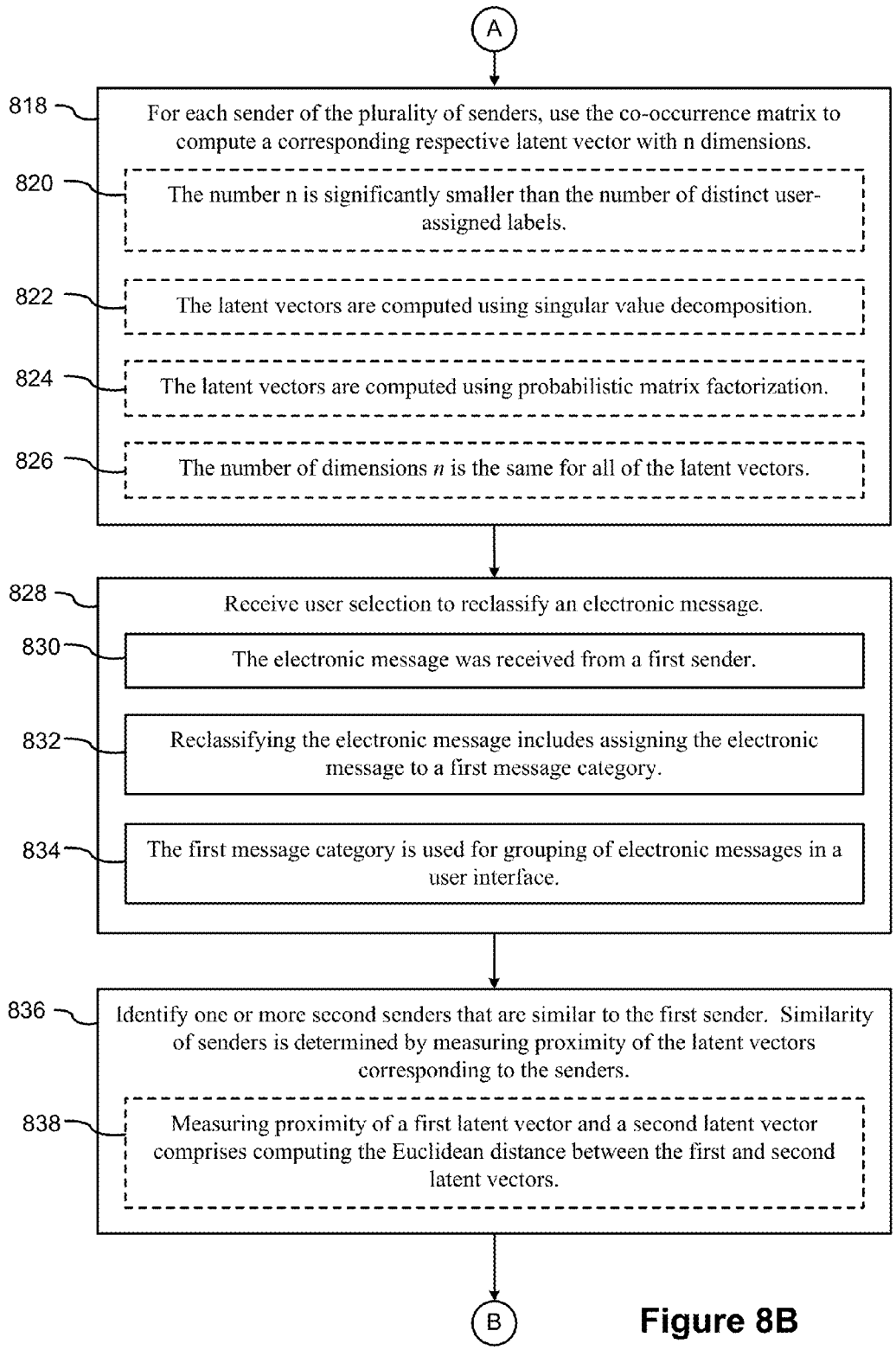
Figure 8C:
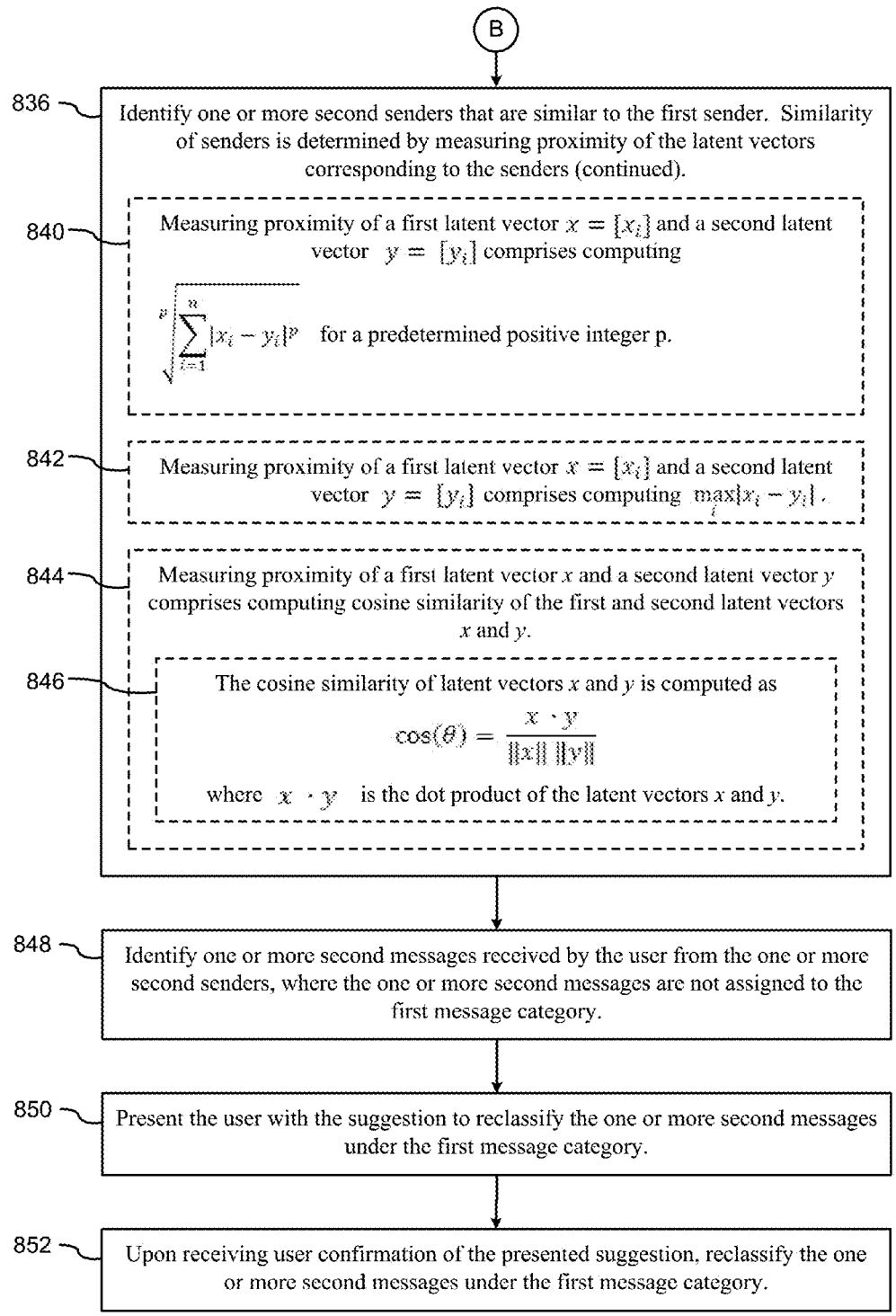

FIGS. 8A-8C provide a flowchart of a process 800, performed by a computing device (e.g., a client device 102 or a server 300), for categorizing (802) electronic messages. The method is performed (804) at a computing device having one or more processors and memory. The memory stores (804) one or more programs configured for execution by the one or more processors. In some implementations, the one or more programs are (806) part of an email application or an instant messaging application.

The computing device receives (808) from a plurality of users user-assigned labels for a plurality of electronic messages received from a plurality of senders. When a sender sends the same message to two or more recipients, each of the recipients can independently choose what labels to apply (if any), and thus the data from all recipients is collected. The categorization system 120 aggregates (810) the received user-assigned labels into a co-occurrence matrix 346 whose axes correspond to the plurality of senders, as illustrated in FIG. 4. The same set of senders is used on both axes. The (s, t) entry in the matrix measures the extent to which users assign the same user-assigned labels to the senders s and t. For example, one user may assign the label "travel" to the senders s and t, while another user may assign the label "vacation" to the senders s and t. The (s, t) entry would account for both of these events because they show that users are assigning the same labels to the two senders.

The entries in the matrix can be computed in various ways. In some implementations, the (s, t) entry of the matrix M is (812) equal to a number of times that senders s and t co-occur in a same user-assigned label from a single user. That is, how many times have individual users assigned the same label to a message from the sender s and a message from the sender t.

In other implementations, the entries of the matrix M comprise (814) pointwise mutual information (PMI). In some implementations that use pointwise mutual information for the matrix entries, each entry (s, t) of the matrix M is (816) equal to $$\log\left(\frac{c_{st}N}{c_s c_t}\right),$$

where N is the total number of distinct user-assigned labels, $c_{st}$ is the number of times that senders s and t co-occur in the same user-assigned label from the same user, $c_s$ is the number of times a user has assigned a user-assigned label to a message from sender s, and $c_t$ is the number of times a user has assigned a user-assigned label to a message from sender t.

The use of pointwise mutual information reduces the effects of random co-occurrences. In particular, when labels are assigned randomly, $$\frac{c_{st}}{N} = \frac{c_s}{N} \cdot \frac{c_t}{N},$$

so $$\frac{c_{st}N}{c_s c_t} = 1,$$

and thus $$\log\left(\frac{c_{st}N}{c_s c_t}\right) = 0.$$

Note that the values can be positive, negative, or 0. In some implementations, computed values whose magnitudes (i.e., absolute value) are smaller than a designated threshold value are replaced by 0.

The Latent Vector Extraction Module 342 then uses (818) the co-occurrence matrix 346 to compute (818) a corresponding respective latent vectors 348 with n dimensions for each sender of the plurality of senders. Typically, the number of dimensions n is (826) the same for all of the latent vectors. In addition, number n is (820) typically significantly smaller than the number of distinct user-assigned labels. For example, the number n is typically 30-50 dimensions, whereas the number of distinct user-assigned labels may be 100, 500, 1000, or more.

In some implementations, the latent vectors are computed (822) using singular value decomposition. In some implementations, the latent vectors are computed (824) using probabilistic matrix factorization. Once the latent vectors 348 are computed (818) by the latent vector extraction module 342, the latent vectors can be used by the sender similarity calculator 344 to determine similarity of the corresponding senders.

Sender similarity can be used in various ways. For example, any time a user takes an action with respect to one sender, the messaging application can recommend taking the same action with respect to other senders that are identified as similar. Actions can include placing a sender on a white list or on a black list. Sender similarity can also be applied to rules used for message classification. For example, if a rule identifies a specific sender, then the rules can be updated to apply in the same way to other senders that are similar to the specific sender.

Sender similarity can also be used when a user re-categorizes an individual message. In this case, the computing device receives (828) user selection to reclassify (also referred to as re-categorizing) an electronic message. The electronic message was received (830) by the user from a first sender. The reclassification includes (832) assigning the electronic message to a first message category (and the message was not previously assigned to the first message category). The first message category is used (834) for grouping of electronic messages in a user interface of the messaging application.

Because the user has reassigned the first electronic message to a different category, the messaging application assists the user by identifying other messages that might need reclassification in the same way. A first set of such message is other messages from the same first sender that are not already assigned to the first message category. In some implementations, the messaging application recommends or suggests reclassifying these messages.

In addition, the sender similarity calculator identifies (836) one or more second senders that are similar to the first sender. Similarity of senders is determined (836) by measuring proximity of the latent vectors corresponding to the senders. As noted above in FIGS. 5-7, measuring proximity of the latent vectors can be done in various ways. As illustrated in FIG. 7, some implementation measure (838) proximity of a first latent vector and a second latent vector by computing the Euclidean distance between the first and second latent vectors. Some implementations measure (840) proximity of latent vectors using the formula $$\sqrt[p]{\sum_{i=1}^{n} |x_i - y_i|^p},$$

where x and y are the vectors, n is the number of dimensions for each of the vectors, and p is a positive integer. Some implementations measure (842) proximity of latent vectors x and y using the formula $\max_i |x_i - y_i|$.

Some implementations measure (844) proximity of a first latent vector x and a second latent vector y by computing cosine similarity of the first and second latent vectors x and y. This is illustrated above with respect to FIGS. 5 and 6. In particular, the cosine similarity of latent vectors x and y is (846) typically computed using the formula $$\cos(\theta) = \frac{x \cdot y}{\|x\| \|y\|},$$

where x·y is the dot product of x and y.

Once the second senders are identified, the messaging application 106 identifies (848) one or more second messages received by the user from the one or more second senders, where the one or more second messages are not already assigned to the first message category. The messaging application 106 presents (850) the user with the suggestion to reclassify the one or more second messages under the first message category. When there are two or more such second messages, the user can choose to reclassify all, some, or none of the messages. When there is only one such second message, the options are either to reclassify that one message, or not.

Upon receiving user confirmation of the presented suggestion (e.g., all or a subset), the categorization system 120 reclassifies (852) the selected second messages under the first message category. In this way, the user's selection to re-categorize a single message enables quick re-categorization of other messages as well.

Once similar senders have been identified, the information can be used in a variety of different ways. Sender similarity is not limited to reassigning message categories. Some implementations use sender similarity in the following scenarios:

Distances between sender embeddings can be used to find groups of related messages (based on their sender addresses) in a user's inbox. The application can show the user a set of similar senders and ask whether to create a new cluster/filter for these senders.

Sender embeddings can be combined with content-based features to obtain a better metric for message similarity.

The coverage for specific email categories (e.g., travel, purchase, or finance) can be increased by whitelisting senders that are "similar" to typical representatives of these categories. Some implementations use a kNN classifier or a softmax classifier to turn relative distances into category decisions.

Sender embeddings can be used to bootstrap content-based models for new categories such as job search or dating. Starting from a prototypical representative, embeddings enable finding a set of related senders. Messages from these senders can then be used as a training set for machine learning.

Together with t-sne visualization or clustering, some implementations use sender embeddings to discover new categories that are relevant for users.

The methods described with respect to sender similarity can be applied to other message properties as well. For example, sender domain, subject, content words, or message template (e.g., order confirmation from a specific online retailer). Similarity of these other message properties can be used in ways similar to sender similarity.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations described herein were chosen and described in order to explain the principles of the invention and its practical applications, to thereby enable others skilled in the art to best utilize the invention and various implementations with various modifications as are suited to the particular use contemplated.

What is claimed is:

1. A method of assigning categories to electronic messages, comprising:
   at a computing device having one or more processors and memory storing one or more programs configured for execution by the one or more processors:
   receiving from a plurality of users user-assigned labels for a plurality of electronic messages received from a plurality of senders;
   aggregating the received user-assigned labels into a co-occurrence matrix M whose axes correspond to the plurality of senders and whose (s, t) entry measures an extent to which users have assigned identical user-assigned labels to the senders s and t;
   for each sender of the plurality of senders, using the co-occurrence matrix to compute a corresponding respective latent vector, with n dimensions, thereby forming a plurality of latent vectors;

receiving, from a first user, selection to reclassify an electronic message, wherein the electronic message was received from a first sender, wherein reclassifying the electronic message includes assigning the electronic message to a first message category, and wherein the first message category is used for grouping of electronic messages in a user interface;

identifying one or more second senders that are similar to the first sender, wherein similarity of senders is determined by measuring proximity of the latent vectors corresponding to the senders;

identifying one or more second messages received by the first user from the one or more second senders, wherein the one or more second messages are not assigned to the first message category;

presenting the first user with the suggestion to reclassify the one or more second messages under the first message category; and upon receiving user confirmation of the presented suggestion, reclassifying the one or more second messages under the first message category.

2. The method of claim 1, wherein each latent vector in the plurality of latent vectors is computed using singular value decomposition or probabilistic matrix factorization.

3. The method of claim 1, wherein the number of dimensions n is the same for all of the latent vectors in the plurality of latent vectors.

4. The method of claim 3, wherein measuring proximity of a first latent vector and a second latent vector in the plurality of latent vectors comprises computing the Euclidean distance between the first and second latent vectors.

5. The method of claim 3, wherein measuring proximity of a first latent vector $x=[x_i]$ and a second latent vector $y=[y_i]$ in the plurality of latent vectors comprises computing:

$$\sqrt[p]{\sum_{i=1}^{n} |x_i - y_i|^p}$$

for a predetermined positive integer p.

6. The method of claim 3, wherein measuring proximity of a first latent vector $x=[x_i]$ and a second latent vector $y=[y_i]$ in the plurality of latent vectors comprises computing:

$$\max_i |x_i - y_i|.$$

7. The method of claim 3, wherein measuring proximity of a first latent vector x and a second latent vector y in the plurality of latent vectors comprises computing cosine similarity of the first and second latent vectors x and y.

8. The method of claim 7, wherein the cosine similarity of latent vectors x and y is computed as $$\cos(\theta) = \frac{x \cdot y}{\|x\| \|y\|},$$

wherein x·y is the dot product of the latent vectors x and y.

9. The method of claim 1, wherein the (s, t) entry of the matrix M is equal to a number of times that senders s and t co-occur in a same user-assigned label from a same user.

10. The method of claim 1, wherein the entries of the matrix M comprise pointwise mutual information.

11. The method of claim 10, wherein the (s, t) entry of the matrix M is equal to $$\log\left(\frac{c_{st} N}{c_s c_t}\right),$$

wherein N is a total number of distinct user-assigned labels, $c_{st}$ is a number of times that senders s and t co-occur in a same user-assigned label from a same user, $c_s$ is a number of times a user has assigned a user-assigned label to a message from sender s, and $c_t$ is a number of times a user has assigned a user-assigned label to a message from sender t.

12. A computing device, comprising:

one or more processors;

memory; and one or more programs stored in the memory configured for execution by the one or more processors, the one or more programs comprising instructions for:

receiving from a plurality of users user-assigned labels for a plurality of electronic messages received from a plurality of senders;

aggregating the received user-assigned labels into a co-occurrence matrix M whose axes correspond to the plurality of senders and whose (s, t) entry measures an extent to which users have assigned identical user-assigned labels to the senders s and t;

for each sender of the plurality of senders, using the co-occurrence matrix to compute a corresponding respective latent vector with n dimensions, thereby forming a plurality of latent vectors;

receiving, from a first user, selection to reclassify an electronic message, wherein the electronic message was received from a first sender, wherein reclassifying the electronic message includes assigning the electronic message to a first message category, and wherein the first message category is used for grouping of electronic messages in a user interface;

identifying one or more second senders that are similar to the first sender, wherein similarity of senders is determined by measuring proximity of the latent vectors corresponding to the senders;

identifying one or more second messages received by the first user from the one or more second senders, wherein the one or more second messages are not assigned to the first message category;

presenting the first user with the suggestion to reclassify the one or more second messages under the first message category; and upon receiving user confirmation of the presented suggestion, reclassifying the one or more second messages under the first message category.

13. The computing device of claim 12, wherein each latent vector in the plurality of latent vectors is computed using singular value decomposition or probabilistic matrix factorization.

14. The computing device of claim 12, wherein the number of dimensions n is the same for all of the latent vectors in the plurality of latent vectors, and wherein measuring proximity of a first latent vector and a second latent vector in the plurality of latent vectors comprises computing the Euclidean distance between the first and second latent vectors.

15. The computing device of claim 12, wherein the number of dimensions n is the same for all of the latent vectors in the plurality of latent vectors, and wherein measuring proximity of a first latent vector $x=[x_i]$ and a second latent vector $y=[y_i]$ in the plurality of latent vectors comprises computing:

$$\sqrt[p]{\sum_{i=1}^{n}|x_i-y_i|^p}$$

for a predetermined positive integer p.

16. The computing device of claim 12, wherein measuring proximity of a first latent vector x and a second latent vector y in the plurality of latent vectors comprises computing cosine similarity of the first and second latent vectors x and y.

17. The computing device of claim 16, wherein the number of dimensions n is the same for all of the latent vectors in the plurality of latent vectors, and wherein the cosine similarity of latent vectors x and y is computed as $$\cos(\theta)=\frac{x\cdot y}{\|x\|\|y\|},$$

wherein x·y is the dot product of the latent vectors x and y.

18. The computing device of claim 12, wherein the (s, t) entry of the matrix M is equal to $$\log\left(\frac{c_{st}N}{c_s c_t}\right),$$

wherein N is a total number of distinct user-assigned labels, $c_{st}$ is a number of times that senders s and t co-occur in a same user-assigned label from a same user, $c_s$ is a number of times a user has assigned a user-assigned label to a message from sender s, and $c_t$ is a number of times a user has assigned a user-assigned label to a message from sender t.

19. A non-transitory computer readable storage medium storing one or more programs configured for execution by a computing device having one or more processors and memory, the one or more programs comprising instructions for:
receiving from a plurality of users user-assigned labels for a plurality of electronic messages received from a plurality of senders;
aggregating the received user-assigned labels into a co-occurrence matrix M whose axes correspond to the plurality of senders and whose (s, t) entry measures an extent to which users have assigned identical user-assigned labels to the senders s and t;
for each sender of the plurality of senders, using the co-occurrence matrix to compute a corresponding respective latent vector with n dimensions, wherein n is less than a number of different user-assigned labels collectively received from the plurality of users, thereby forming a plurality of latent vectors;
receiving, from a first user, user selection to reclassify an electronic message from a first user, wherein the electronic message was received from a first sender, wherein reclassifying the electronic message includes assigning the electronic message to a first message category, and wherein the first message category is used for grouping of electronic messages in a user interface;
identifying one or more second senders that are similar to the first sender, wherein similarity of senders is determined by measuring proximity of the latent vectors corresponding to the senders;
identifying one or more second messages received by the first user from the one or more second senders, wherein the one or more second messages are not assigned to the first message category;
presenting the first user with the suggestion to reclassify the one or more second messages under the first message category; and
upon receiving user confirmation of the presented suggestion, reclassifying the one or more second messages under the first message category.

20. The non-transitory computer readable storage medium of claim 19, wherein each latent vector in the plurality of latent vectors is computed using singular value decomposition or probabilistic matrix factorization.

* * * * *